United States Patent
Miyawaki et al.

(10) Patent No.: US 7,277,566 B2
(45) Date of Patent: Oct. 2, 2007

(54) MICROSCOPE SYSTEM

(75) Inventors: Atsushi Miyawaki, Wako (JP); Takashi Fukano, Wako (JP)

(73) Assignee: Riken, Saitama-Ken (JP)

( * ) Notice: Subject to any disclaimer, the term of this patent is extended or adjusted under 35 U.S.C. 154(b) by 673 days.

(21) Appl. No.: 10/662,355

(22) Filed: Sep. 16, 2003

(65) Prior Publication Data

US 2004/0061914 A1    Apr. 1, 2004

(30) Foreign Application Priority Data

Sep. 17, 2002    (JP)    ............... 2002-270203

(51) Int. Cl.
G06K 9/00    (2006.01)

(52) U.S. Cl. .................... 382/128; 356/601
(58) Field of Classification Search ........ 382/128, 382/285, 286; 359/196; 356/601, 317
See application file for complete search history.

(56) References Cited

U.S. PATENT DOCUMENTS

| | | | |
|---|---|---|---|
| 6,429,897 B2 * | 8/2002 | Derndinger et al. | 348/295 |
| 6,819,415 B2 * | 11/2004 | Gerstner et al. | 356/124 |
| 6,947,133 B2 * | 9/2005 | Wolleschensky et al. | 356/317 |

FOREIGN PATENT DOCUMENTS

| DE | 44 36 500 A | 5/1995 |
|---|---|---|
| JP | 11-83454 A | 3/1999 |
| JP | 2002-500369 A | 1/2002 |
| WO | WO99/34301 A1 | 7/1999 |
| WO | WO-02/12945 A2 | 2/2002 |

OTHER PUBLICATIONS

Proll K-P et al .: "Application of a Liquid-Crystal Spatial Light Modulator for Brightness Adaptation in Microscopic Topometry," Applied Optics, Optical Society of America, vol. 39, No. 34, Dec. 1, 2000, pp. 6430-6435.

* cited by examiner

Primary Examiner—Phuoc Tran
(74) Attorney, Agent, or Firm—Birch, Stewart, Kolasch & Birch, LLP

(57) ABSTRACT

A microscope system comprises: a control means (18) capable of generating electric control signals (18a); a spatial modulator means (7) having an illuminated surface (7a) to be illuminated by light emitted by a light source (1), and capable of receiving the electric control signal and of spatially modulating reflection characteristic or transmission characteristic of the illuminated surface by a spatial frequency specified by the electric control signal; an illuminating optical means (8, 11) for illuminating a specimen (12) with light spatially modulated by the spatial modulator means; an image detecting means (15) for detecting a signal image formed by signal light emitted by the specimen illuminated by the illuminating optical means; and an arithmetic means (16) for processing signal images formed by using the spatial frequency of at least three different phases set by the control means and detected by the image detecting means to obtain an optical sectioned image.

8 Claims, 5 Drawing Sheets

MICROSCOPE SYSTEM

This nonprovisional application claims priority under 35 U.S.C. § 119(a) on Patent Application No. 2002-270203 filed in JAPAN on Sep. 17, 2002, which is herein incorporated by reference.

BACKGROUND OF THE INVENTION

1. Field of the Invention

The present invention relates to a microscope system and, more particularly, to a microscope system capable adjusting the thickness of an optical sectioned image.

2. Description of the Related Art

Fluorescence microscopes are used widely in various fields including the medical and the biological field for detecting proteins and genes marked with fluorescent markers. Recently, multiple fluorescence detection that observes a specimen dyed with a plurality of fluorescent dyes and a specimen expressing a plurality of fluorescent proteins has become a powerful tool for the analysis of genes and intracellular structures.

A laser confocal microscope among fluorescence microscopes, in particular, differs from ordinary microscopes; the laser confocal microscope forms an image by detecting fluorescent light emitted from a point on which a laser beam is focused, removing fluorescent light emitted from parts other than the part at the focal point or scattered light with a pinhole screen placed in front of a detector. Thus, a high-contrast image of only a part at the focal point, i.e., an optical sectioned image, can be obtained.

A recently marketed laser microscope includes a detector, and a screen disk disposed in front of the detector and provided with a plurality of pinholes respectively having different diameters. The screen disk is turned to use the pinholes having the different diameters selectively. Another laser microscope has a variable-pinhole screen provided with a variable pinhole whose diameter can selectively be determined. The user of the laser microscope selects an optimum diameter for the pinhole according to the condition and shape of the specimen or according to the quantity of fluorescent dyes contained in the specimen or the amount of the fluorescent protein expressed by the specimen to adjust the thickness of an optical sectioned image of the specimen optionally.

A fringe projection method is a means for obtaining an optical sectioned image disclosed in Jpn. Pat. No. 3066874 (Patent document 1) The stripe projection method projects a light beam on a grating or the like, illuminates a specimen with a bright-and-dark periodic optical pattern having alternate arrangement of bright and dark parts formed by the grating, and takes a photograph of the thus illuminated specimen with a camera. A plurality of images obtained by using a plurality of bright-and-dark periodic optical patterns having different phases are processed, and periodic patterns are removed to obtain an optical sectioned image of a desired part.

Since the stripe projection method disclosed in Patent document 1 uses the grating for forming the bright-and-dark pattern, intervals between the elements of the periodic pattern is entirely dependent on the grating constant of the grating. Consequently, the thickness of the optical sectioned image cannot freely be adjusted according to the condition and shape of the specimen or according to the amount of fluorescent dyes contained in the specimen or the amount of expressed fluorescent proteins during observation. Such a problem may be solved by selectively using a plurality of gratings respectively having different grating constants. However, the optical system must be readjusted every time the grating is changed and hence it is difficult to change the grating quickly during observation of the specimen. Although the phase of the bright-and-dark pattern is shifted by moving the grating, an error in distance by which the grating is moved causes an error in phase shift, eventually deteriorating the optical sectioned image.

SUMMARY OF THE INVENTION

Accordingly, it is an object of the present invention to solve the problems in the prior art and to provide a microscope system capable of quickly setting a desired thickness for an optical sectioned image during the observation of a specimen.

According to the present invention, a microscope system comprises: a control means capable of generating electric control signals; a spatial modulator means having an illuminated surface to be illuminated by light emitted by a light source, and capable of receiving the electric control signal and of spatially modulating reflection characteristic or transmission characteristic of the illuminated surface by a spatial frequency specified by the electric control signal; an illuminating optical means for illuminating a specimen with light spatially modulated by the spatial modulator means; an image detecting means for detecting a signal image formed by signal light emitted by the specimen illuminated by the illuminating optical means; and an arithmetic means for processing signal images formed by using the spatial frequency of at least three different phases set by the control means and detected by the image detecting means to obtain an optical sectioned image.

In the microscope system according to the present invention, the control means is capable of setting a thickness for the optical sectioned image by setting the spatial frequency.

In the microscope system according to the present invention, the control means is capable of dividing the illuminated surface of the spatial modulator means into a plurality of regions and of setting spatial frequencies for the individual regions.

In the microscope system according to the present invention, the plurality of regions determined by dividing the illuminated surface correspond to divisional observation regions whose optical sectioned images need to be formed in different thicknesses, respectively.

The microscope system according to the present invention may further comprise a monitoring means having a monitor screen capable of displaying signal images respectively corresponding to the plurality of regions of the illuminated surface.

In the microscope system according to the present invention, the spatial modulator means is a digital micromirror device, and the illuminated surface is formed by arranging a plurality of micromirrors.

In the microscope system according to the present invention, the spatial modulator means is a liquid crystal device, and the illuminated surface is formed by arranging a plurality of liquid crystal cells.

In the microscope system according to the present invention, the spatial modulator means receives the electric control signal and is capable of sinusoidally spatially modulating the reflection characteristic or the transmission characteristic of the illuminated surface.

In the microscope system according to the present invention, the signal light is reflected light, transmitted light or fluorescent light.

The spatial modulator means of the microscope system according to the present invention is capable of spatially modulating the reflecting characteristic or the transmission characteristic of the illuminated surface by a spatial frequency specified by the electric control signal. Thus, desired thickness can quickly be set for the optical sectioned image during the observation of the specimen.

The thickness of the optical sectioned image can easily be adjusted to a desired value by setting a spatial frequency of the spatial modulator means by the electric control signal provided by the control means.

Since the illuminated surface of the spatial modulator means can be divided into the plurality of regions, and spatial frequencies can be set respectively for the individual regions, thicknesses suitable for the observation regions of the specimen can be set for the individual regions.

The plurality of signal images for which thicknesses are set for individual optical sectioned images can be displayed on the monitor screen when necessary.

BRIEF DESCRIPTION OF THE DRAWINGS

The above and other objects, features and advantages of the present invention will become more apparent from the following description taken in connection with the accompanying drawings, in which.

DESCRIPTION OF THE PREFERRED EMBODIMENTS

Figure 1:
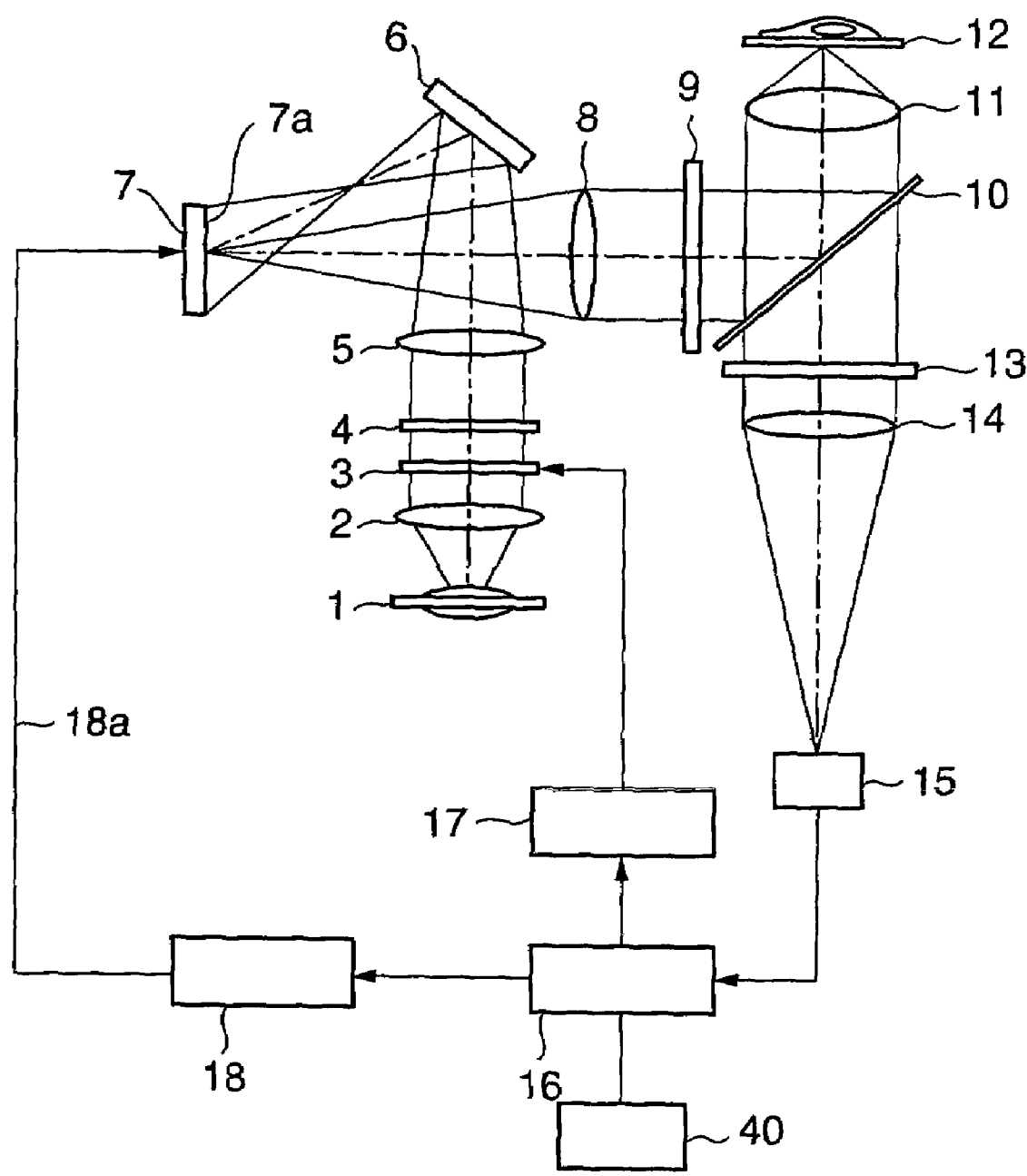
FIG. 1 is a diagrammatic view of a microscope system in a first embodiment according to the present invention.

FIG. 1 shows a microscope system in a first embodiment according to the present invention. A light source 1 for illuminating a specimen 12 is a light source that emits white light, such as a mercury lamp, xenon lamp or a light-emitting diode. Light rays emitted by the light source 1 are collimated by a collector lens 2 in a parallel light beam. A shutter 3, a diffuser plate 4, a lens 5 and a flat mirror 6 are arranged in that order on the optical axis of the parallel light beam. The shutter 3 opens to illuminate the specimen 12 and closed to intercept the light beam. The diffuser plate 4 diffuses the light beam to illuminate a digital micromirror device (DMD) 7 uniformly. The lens 5 converges the light beam before the light beam reaches the DMD 7 so that diverging light rays fall on the DMD 7 to prevent the formation of a diffraction pattern due to the periodic construction of the DMD 7. The construction and function of the DMD 7 will be described later. The flat mirror 6 adjusts the incident angle of the light beam emitted by the light source 1 on the DMD 7 so that the intensity of the light beam reflected by the DMD 7 and illuminating the specimen 12 may be the highest.

The DMD 7 reflects the light beam toward a microscope. A lens 8, an excitation filter 9 and a dichroic mirror 10 are arranged in that order on a perpendicular to the DMD 7. The lens 8 collimates light rays reflected by micromirrors included in the DMD 7 in a parallel light beam. The DMD 7 is disposed at a position corresponding to the front focal point of the lens 8. The excitation filter 9 transmits only light in a predetermined wavelength range. The dichroic mirror 10 reflects light in a predetermined wavelength range and transmits and allows light in other wavelength ranges to pass. Light reflected by the dichroic mirror 10 travels through an objective 11 and falls on the specimen 12 to illuminate the specimen 12. The specimen 12 is mounted on a stage, not shown. The stage can minutely be moved along the optical axis. The thickness of an optical sectioned image is dependent on the spatial period of a pattern formed on the DMD 7. Generally, the shorter the spatial period, i.e., the higher the spatial frequency, the greater is the thickness of the optical sectioned image. The term "thickness of an optical sectioned image" signifies a thickness in which signal light rays can integrally be detected corresponding to focal depth.

The specimen 12 mounted on the stage is moved slightly along the optical axis, and the specimen 12 is photographed at positions corresponding to the thicknesses of the optical sectioned image corresponding to the spatial period of the pattern to obtain a plurality of optical sectioned images of the specimen 12. A three-dimensional image can be formed by assembling the plurality of optical sectioned images. It is possible to acquire information about the time-dependent variation of the optical sectioned image when the specimen 12 is located at a desired position by slightly moving the specimen 12 mounted on the stage and fixing the specimen 12 at the desired position.

The objective 11, the dichroic mirror 10, a emission filter 13, a focusing lens 14 and a CCD camera 15 are arranged on the observation optical path of the microscope. Fluorescent light emitted by the specimen 12 is converted into a parallel fluorescent light beam by the objective 11, the fluorescent light beam travels through the dichroic mirror 10. The emission filter 13 passes the fluorescent light having wavelengths in a predetermined wavelength range selectively. The focusing lens 14 focuses the fluorescent light beam in an image on the CCD camera 15.

The output signal of the CCD camera 15 is received by a frame grabber, not shown, i.e., a storage means, included in a computer 16. The image received by the frame grabber is processed by an operation, which will be described later, and the result of operation is displayed on a monitor screen 40 and is stored in a storage device included in the computer 16.

A controller 17 controls the shutter 3 according to a control signal provided by the computer 16. A controller 18 provides an electric signal to control the angular positions of the micromirrors of the DMD 7. A pattern signal representing a pattern produced by the computer 16 is given to the controller 18, and the controller 18 controls the micromirrors of the DMD 7 according to the pattern signal to form the pattern on the DMD 7. Operations for controlling the shutter 3 and changing the pattern formed on the DMD 7 are performed in synchronism with the photographing operation of the CCD camera 15

The micromirrors of the DMD 7 are arranged in a two-dimensional space to form an illuminated surface 7a. Each of the micromirrors can be set in either of two angular positions with respect to a perpendicular to the illuminated surface 7a of the DMD 7 according to the electric signal 18a provided by the controller 18. In this specification, a state of the micromirror set in an angular position to reflect the light emitted by the light source 1 toward a lower optical element, i.e., the lens 8 in FIG. 1, will be called an on-state, and a state of the micromirror set in an angular position not to reflect the light emitted by the light source 1 toward the lower optical element will be called an off-state. When the micromirror is in the on-state, the light reflected by the micromirror travels through the microscope and the specimen 12 is illuminated. When the micromirror is in the off-state, the light reflected by the micromirror is not introduced into the microscope and the specimen 12 is not illuminated. The intensity of illumination of the specimen 12 can be changed by controlling the ratio of time in which the micromirror is in the on-state and time in which the same is in the off-state in a predetermined period by pulse-width modulation. Thus, the spatial modulation of the distribution of the intensity of light emitted by the light source 1 on the DMD can be achieved by setting the micromirrors in the on-state or the off-state and controlling the time ratio between the on-state and the off-state of each micromirror in a unit time. For example, sinusoidal spatial modulation can be achieved by controlling the time ratio between the on- and the off-state in a unit time. The DMD 7 and a lens system consisting of the lens 8 and the objective 11 are conjugate with respect to the specimen 12. Therefore, the distribution of the intensity of light emitted by the light source 1 and spatially modulated by the DMD 7 is reproduced in a reduced area on the surface of the specimen 12.

The operation of the microscope system will be described. The light source 1 is turned on. The collector lens 2 converts light emitted by the light source 1 into a parallel beam, the diffuser plate 4 diffuses the parallel light beam, the diffused light beam travels through the lens 5 and is reflected toward the DMD 7 by the flat mirror 6 to illuminate the DMD 7. The intensity distribution of the light fallen on the DMD 7 is spatially modulated according to a pattern formed on the DMD 7. The spatially modulated light beam travels through the lens 8 and the excitation filter 9. The dichroic mirror 10 reflects the light beam toward the objective 11. The spatially modulated light beam travels through the objective 11 and falls on the specimen 12. A fluorescent substance contained in the specimen 12 is excited according to the intensity distribution of the light beam illuminating the specimen 12 and emits fluorescent light. The fluorescent light emitted by the specimen 12 travels through the objective 11, the dichroic mirror 10 the emission filter 13 and the focusing lens 14 and falls on the CCD camera 15. An image formed by the CCD camera is stored in the frame grabber of the computer 16.

An optical sectioned image is processed by the following procedure. The following description will be made on an assumption that a pattern has a linear, periodic intensity distribution. The computer 16 generates a first pattern having a linear, periodic intensity distribution, such as a sinusoidal pattern, in which the specimen 12 is to be illuminated. The computer 16 gives a first pattern signal representing the first pattern to the controller 18. The controller 18 generates a micromirror control signal for selectively setting some of the micromirrors in the on-state and setting the rest in the off-state according to the first pattern signal, and sends the micromirror control signal to the DMD 7. The DMD 7 determines the micromirrors to be set in the on-state and those to be set in the off-state according to the micromirror control signal to form a first pattern thereon. When the shutter 3 is opened by a signal provided by the computer 16, the light beam emitted by the light source 1 is spatially modulated according to the first pattern formed on the DMD, and the intensity of the light beam is distributed in an intensity distribution of a pattern corresponding to the first pattern generated by the computer 16. The specimen 12 is illuminated by the light beam having such an intensity distribution pattern. Then, the specimen 12 generates fluorescent light, and the CCD camera 15 photographs a fluorescent image formed in the specimen 12. This fluorescent image will be called a first image.

Subsequently, the computer 16 generates a second pattern having a linear, periodic intensity distribution of a phase different from that of the linear, periodic intensity distribution in the first pattern by 90°. The specimen 12 is illuminated by light beam of an intensity distribution corresponding to the second pattern, and the CCD camera 15 photographs a fluorescent image formed in the thus illuminated specimen 12. This image will be called a second image. Then, the computer 16 generates a third pattern having a linear, periodic intensity distribution of a phase different from that of the linear, periodic intensity distribution in the first pattern by 180°. The specimen 12 is illuminated by light beam of an intensity distribution corresponding to the third pattern, and the CCD camera 15 photographs a fluorescent image formed in the thus illuminated specimen 12. This image will be called a third image. The computer 16 executes an operation using Expression 1 to obtain an optical sectioned image.

$$I_{OS} \propto [(I_0-I_{90})^2+(I_{90}-I_{180})^2]^{1/2} \quad (1)$$

where $I_0$, $I_{90}$ and $I_{180}$ are luminance distributions in the first, the second and the third image.

The computer 16 executes an operation using Expression (2) to obtain an image that is not an optical sectioned image, namely, an ordinary microscopic image.

$$I_{CV} \propto I_0+I_{180} \quad (2)$$

The optical sectioned images and the microscopic image are stored in the storage device of the computer 16 and are displayed on the monitor screen 40.

The period of the pattern having the linear, periodic intensity distribution can be changed. Change of the spatial frequency that determines the spatial period of the pattern can easily be specified by operating the computer 16. If the optical sectioned image is excessively thick, the period of the pattern having the linear, periodic intensity distribution is shortened and the foregoing procedure is repeated to obtain a new optical sectioned image of a desired thickness can be obtained. Thus, an optical sectioned image of an optimum thickness can be obtained.

The phase shift may be 120° instead of 90°. When the phase shift is 120°, the computer executes an operation using Expression (3) to obtain an optical sectioned image and an operation using Expression (4) to obtain a microscopic image.

$$I_{OS} \propto [(I_0-I_{120})^2+(I_{120}-I_{240})^2+(I_{240}-I_0)^2]^{1/2} \quad (3)$$

$$I_{CV} \propto I_0+I_{120}+I_{240} \quad (4)$$

where I0 is a first image, i.e., an image of a phase shift of 0°, $I_{120}$ is a second image, i.e., an image of a phase shift of 120°, and $I_{240}$ is an image of a phase shift of 240°.

Any optional phase shift other than the foregoing phase shifts may be used, provided that images obtained by using at least three different phase shifts are used.

Although the foregoing phase shift uses the pattern having the linear, periodic intensity distribution, a pattern having a two-dimensional, periodic intensity distribution, such as a checkered pattern, may be used for phase shift.

Since the pattern in which the specimen 12 is to be illuminated can easily be specified by operating the computer 16, the thickness of the optical sectioned image can quickly and optionally be changed according to the condition and the intensity of the fluorescent light during the observation of the specimen 12.

Since the micromirrors of the DMD 7 are arranged accurately at equal intervals in a two-dimensional space, an error in phase shift due to an error in movement is smaller than that occurs when, for example, a grating is moved for phase shift.

Since the intensity distribution, as well as the pattern in which the specimen 12 is to be illuminated, can easily be adjusted by using the DMD 7, the specimen 12 can be illuminated with light having an optimum intensity distribution.

A signal of a wavelength in an optional wavelength range can be extracted by using the light source 1 that emit white light, and properly changing the excitation filter 9, the dichroic mirror 10 and the fluorescent filter 13. Thus, the microscope system can be applied to detecting all kinds of fluorescent dyes and fluorescent proteins. Whereas a laser scanning microscope is subject to a restriction on the wavelength of the exciting light and needs to use a laser that emits laser light having a particular wavelength, the microscope system is not subject to any restriction on the exciting light.

The DMD 7 shown in FIG. 1 is a spatial light modulator. A reflection-type liquid crystal display may be used instead of the DMD 7 to obtain an optical sectioned image by detecting fluorescent light or reflected light.

The present invention as applied to the measurement of depth response will be described. Depth corresponds to the thickness of an optical sectioned image.

Depth response was measured to examine the performance of the microscope system of the present invention. The specimen was a fluorescent thin film of about 50 nm in thickness. The fluorescent thin film was formed by coating a surface of a cover glass with a mixture of rhodamine 6G and polymethyl acrylate by spin-coating. A filter that transmits light having a transmission wavelength width of 40 nm and a center wavelength of 475 nm was used as the excitation filter 9. A dichroic mirror that reflects light of wavelengths below 505 nm and allows light of wavelengths not shorter than 505 nm was used as the dichroic mirror 10. A fluorescent filter that transmits light having a transmission wavelength width of 45 nm and a center wavelength of 535 nm was used as the emission filter 13. An immersion objective having a magnification of 40× and a numerical aperture of 1.35 was used as the objective 11. The fluorescent thin film was mounted on the stage, the stage supporting the fluorescent thin film was moved along the optical axis, and the intensities of calculated optical sectioned images were measured at different positions of the stage.

Figure 2:
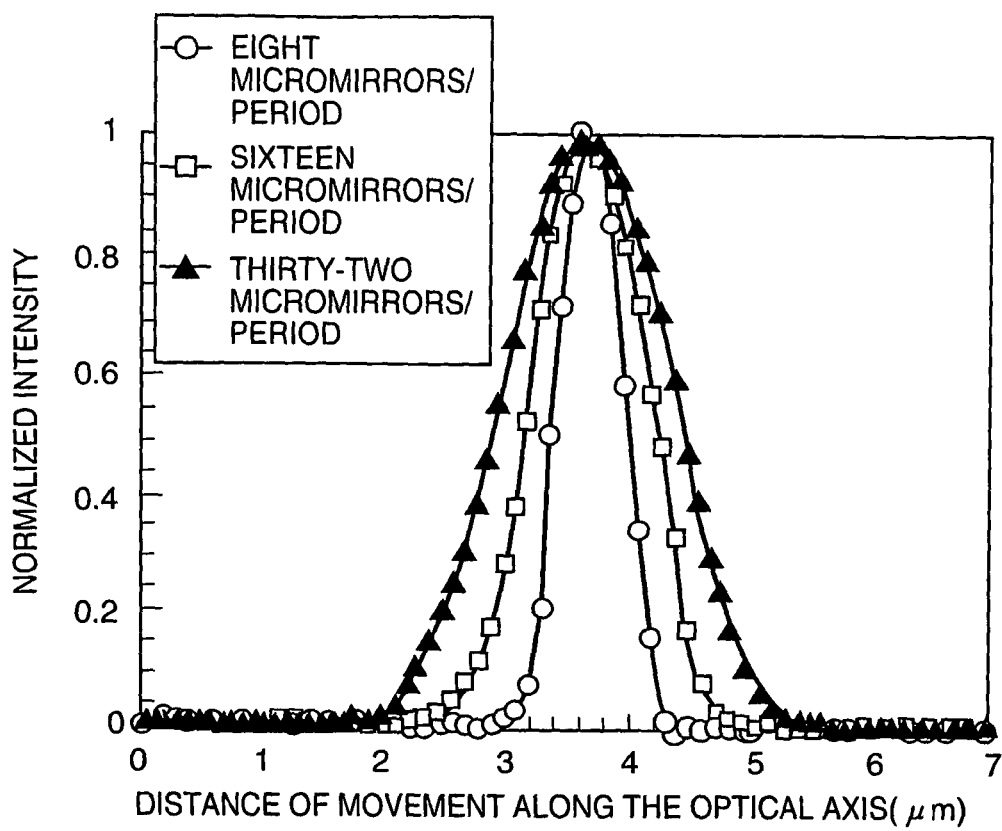
FIG. 2 is a graph of assistance in explaining the depth response of the microscope system in the first embodiment.

FIG. 2 shows the result of measurement of depth response. Experiments were conducted under the same conditions for different types of stripes that were formed by arranging 8, 16 and 32 micromirrors in one stripe period on the DMD 7. The periods of the stripes on the surfaces of the specimens were 2.5, 4.9 and 9.8 μm. As obvious from FIG. 2, the full-width at half maximum of depth response increases, i.e., the thickness of the optical sectioned image increases, when the spatial period on the DMD 7 is increased. It is known from FIG. 2 that an optical sectioned image of a desired thickness can be obtained by adjusting the spatial period on the DMD 7.

Figure 3:
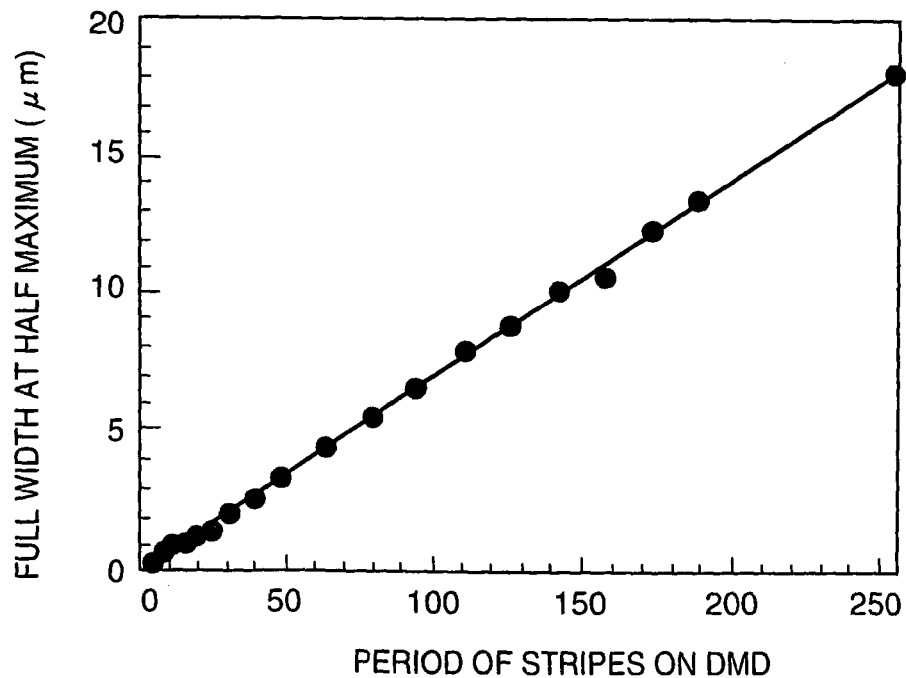
FIG. 3 is a graph showing the relation between the period of stripes to be projected and the full width at half maximum of depth response of the microscope system in the first embodiment.

The relation between the period of stripes on the DMD 7 and the full width at half maximum of depth response was studied. FIG. 3 shows the relation between the period of stripes on the DMD 7 and the full width at half maximum of depth response. Experiments similar to the foregoing experiments were conducted for different periods of stripes and depth response was measured. Values of full width at half maximum were determined on the basis of measured values of depth response, and the relation between full width at half maximum and the period of stripes was examined. As obvious from FIG. 3, the full width at half maximum of depth response, i.e., the thickness of an optical sectioned image, changes linearly with the period of stripes on the DMD 7. Thus, the full width at half maximum of depth response, i.e., the thickness of an optical segment, can freely and surely be changed by changing the period of stripes projected on the DMD 7.

A segmental optical sectioned image having optical sectioned image regions respectively having different thicknesses D will be described with reference to FIGS. 6 and 7.

Figure 6:
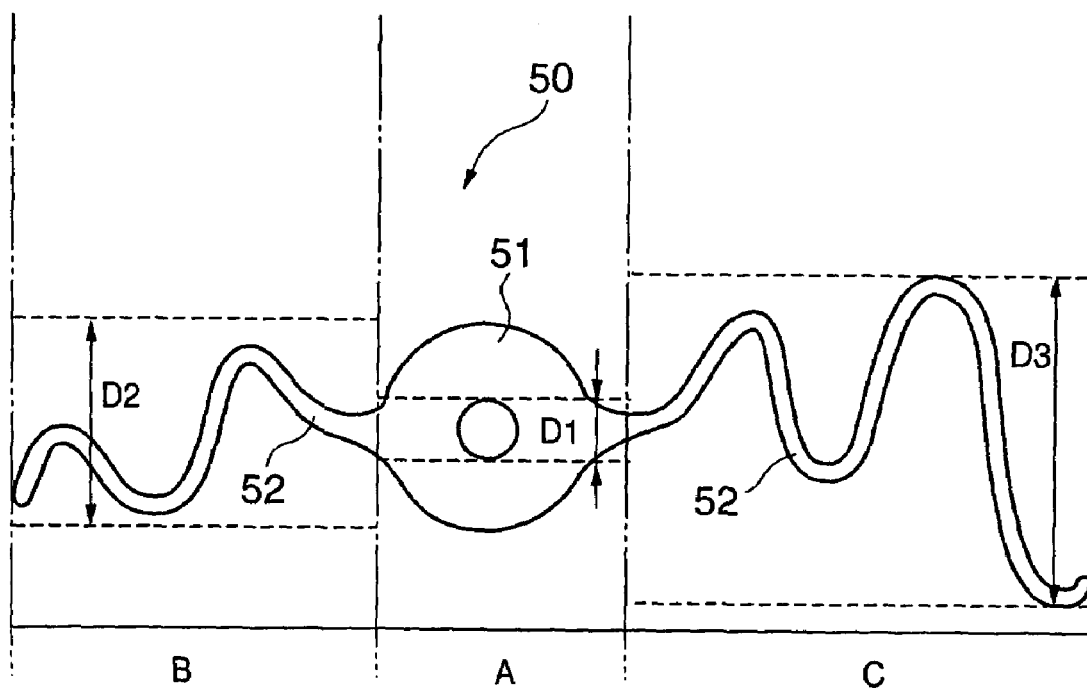
FIG. 6 is a typical sectional view of observation regions, for which thicknesses are set individually, on a specimen.

Referring to FIG. 6, a nerve cell 50 has a cell body 51 and dendrite 52 projecting in opposite directions from the cell body 51. A space including the nerve cell 50 is divided into an observation region A including the cell body 51, and side observation regions B and C including the dendrite 52. It is preferable to form an optical sectioned image having a small thickness D1 of the observation region A to facilitate the observation of the cell body 51, to form an optical sectioned image having a somewhat big thickness D2 of the observation region B because the dendrite 52 in the observation region B is curved in a moderate depth, and to form an optical sectioned image having a big thickness D3 of the observation region C because the dendrite 52 in the observation region C is curved in a big depth.

Figure 7:
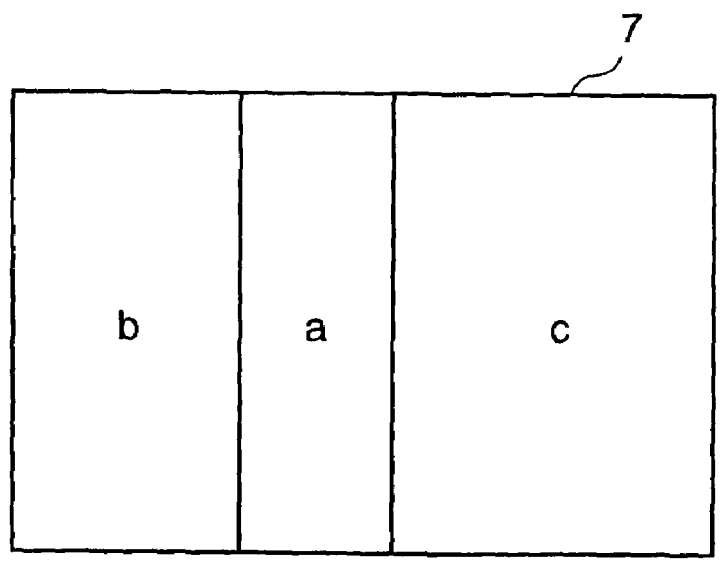
FIG. 7 is a view of the illuminated surface of a digital micromirror device (DMD) divided into a plurality of regions corresponding to the observation regions of a specimen.

As shown in FIG. 7, the illuminated surface of the DMD 7 is divided into regions a, b and c respectively corresponding to the observation regions A, B and C. Spatial periods are set respectively for the regions a, b and c of the DMD 7 such that optical sectioned images of the observation regions A, B and C have thicknesses D1, D2 and D3, respectively. The optical sectioned images of the regions A, B and C are displayed simultaneously on the common monitor 40.

Thus, the controller 18 sets the different spatial periods for the plurality of regions on the DMD 7, i.e., a spatial light modulator to form the optical sectioned images having the optimum thicknesses of the observation regions on the specimen 12. The plurality of observation regions on the specimen 12 can simultaneously be observed on the common monitor.

Figure 4:
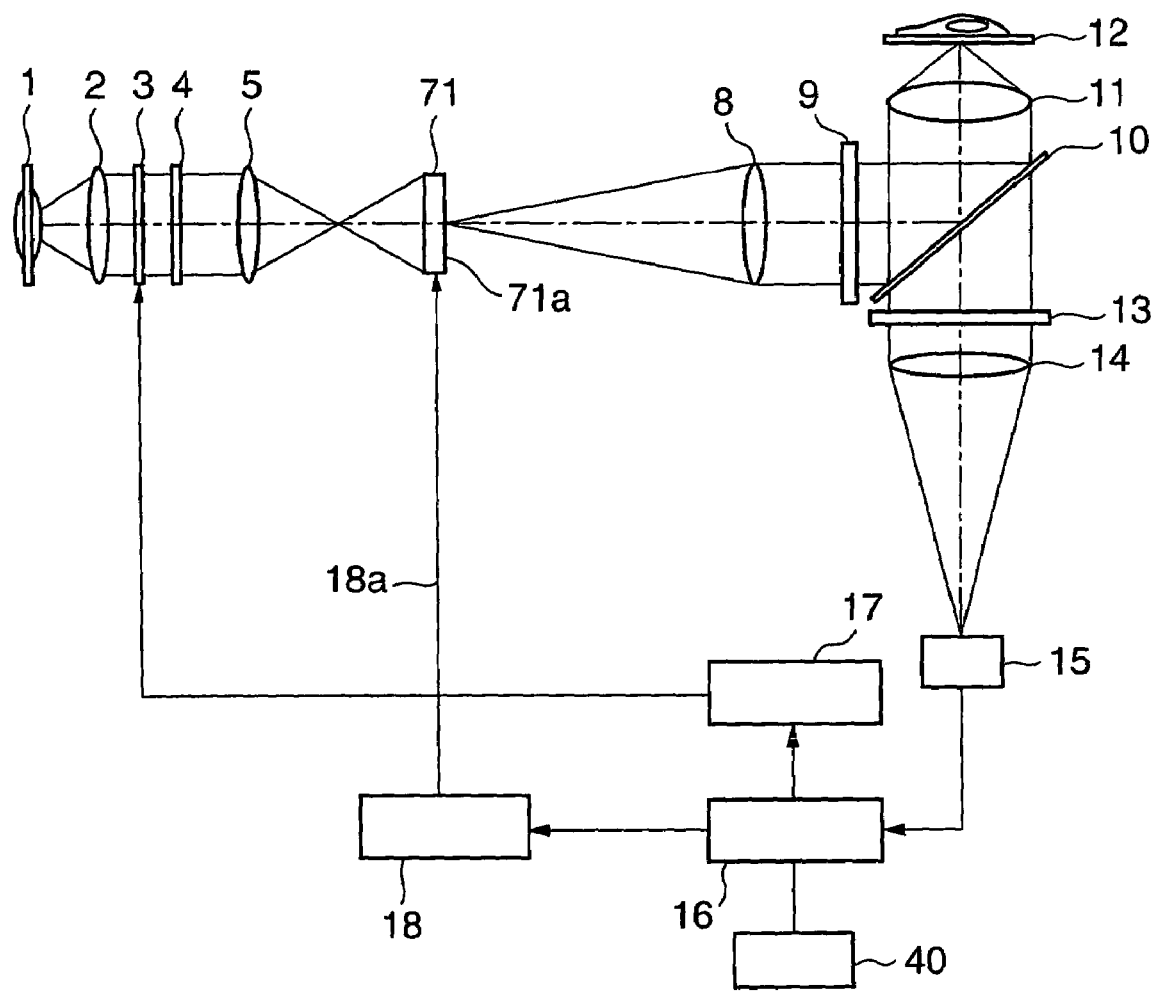
FIG. 4 is a diagrammatic view of a microscope system in a second embodiment according to the present invention.

A microscope system in a second embodiment according to the present invention will be described with reference to FIG. 4, in which parts like or corresponding to those shown in FIG. 1 are denoted by the same reference characters and the description thereof will be omitted.

The microscope system in the second embodiment includes a transmission-type liquid crystal device 71, i.e., a spatial light modulator. As shown in FIG. 4, a collector lens 2, a shutter 3, a diffuser plate 4, a lens 5, a liquid crystal device 71, a lens 8 and an excitation filter 9 are arranged in that order on an optical axis extending between a light source 1 and a dichroic mirror 10. The liquid crystal device 71 has an illuminated surface 71a formed by two-dimensionally arranging a plurality of liquid crystal pixels. The respective transmittances of the liquid crystal pixels can individually be changed by electric signals provided by a controller 18. The spatial modulation of the intensity distribution of light emitted by the light source 1 can be achieved by changing the transmittances of the liquid crystal pixels individually. A reduced light pattern having an intensity distribution corresponding to a light pattern formed on the liquid crystal device 71 and having the intensity distribution spatially modulated by the liquid crystal device 71 is projected on a surface of a specimen 12 for illumination.

Thus, the liquid crystal device 71 having the liquid crystal pixels respectively having changeable transmittances spatially modulates the intensity distribution of the light emitted by the light source 1 to achieve the same effect as the first embodiment.

Figure 5:
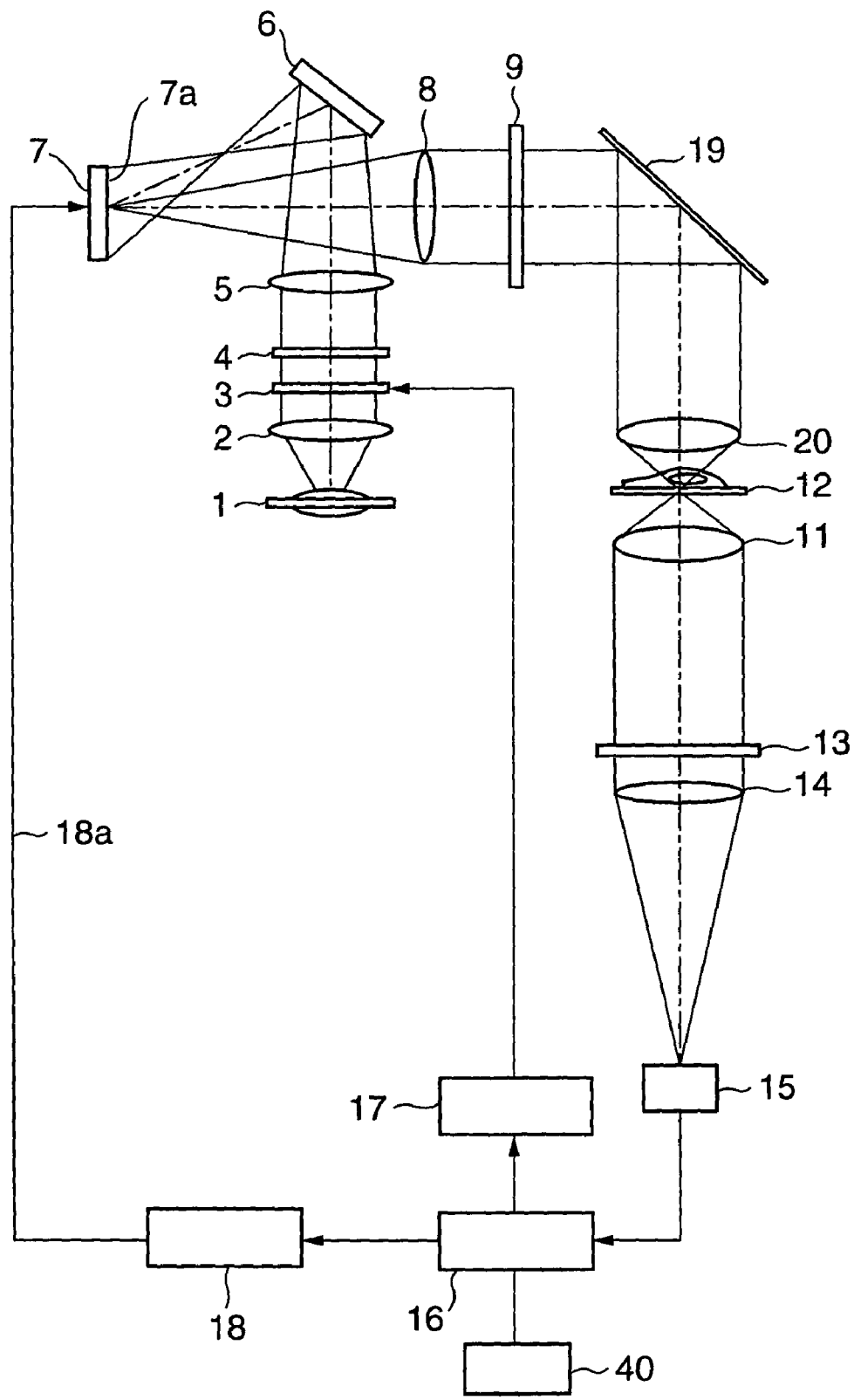
FIG. 5 is a diagrammatic view of a microscope system in a third embodiment according to the present invention.

A microscope system in a third embodiment according to the present invention will be described with reference to FIG. 5, in which parts like or corresponding to those shown in FIG. 1 are denoted by the same reference characters and the description thereof will be omitted.

In the microscope system in the third embodiment, light reflected by a DMD 7 is reflected toward a microscope. A lens 8, an excitation filter 9 and a flat mirror 19 are arranged on a perpendicular to the DMD 7. Light reflected by the flat mirror 19 travels through an objective 20 and illuminates a specimen 12. The objective 11, a fluorescent filter 13, a focusing lens 14 and a CCD camera 15 are arranged on the optical axis of the microscope. Fluorescent light emitted by the specimen 12 is converted into a parallel fluorescent light beam by the objective 11. Light rays of the fluorescent light beam are selectively filtered by the fluorescent filter 13 and light rays having wavelengths in a predetermined wavelength range travel through the fluorescent filter 13, are focused in an image on the imaging plane of the CCD camera 15 by the focusing lens 14.

Both the objectives 11 and 20 or either the objective 11 or the objective 20 can slightly be moved along the optical axis of the microscope. The relative positions of the objectives 11 and 20 are adjusted beforehand such that the respectively focal points of the objectives 11 and 20 coincide with each other.

When a light source 1 is turned on, light emitted by the light source is collimated into a parallel light beam, the light beam is diffused by a diffuser plate 4, the light beam travels through a lens 5 and is reflected by a flat mirror 6 toward the DMD 7 to illuminate the DMD 7. The intensity distribution of the light fallen on the DMD 7 is modulated according to a pattern formed on the DMD 7. The light having a thus modulated intensity distribution travels through the lens 8 and the excitation filter 9, is reflected by the flat mirror 19, travels through the objective 20 and falls on the specimen 12. A fluorescent substance contained in the specimen 12 is excited according to the intensity distribution of the light fallen on the specimen 12 and generates fluorescent light. The fluorescent light travels through the objective 11 and the emission filter 13, and is focused in an image on the CCD camera 15 by the focusing lens 14. Data on the image provided by the CCD camera 15 is stored in a frame grabber included in a computer 16.

The microscope system in the third embodiment illuminates the specimen 12 by the light having spatially modulated intensity distribution modulated by the DMD 7 capable of forming a variable pattern, and the image formed by the fluorescent light is recorded by the CCD camera 15. Thus, the microscope system in the third embodiment achieves the same effect as that in the first embodiment. Since the microscope in the third embodiment does not need any dichroic mirror, the degree of freedom of selection of the excitation filter 9 and the emission filter 13 is increased greatly because the effect of optical characteristics of a dichroic mirror that needs otherwise to be taken in consideration does not need to be taken into consideration in selecting the excitation filter 9 and the emission filter 13. The microscope system is inexpensive because the same does not need any expensive dichroic mirror.

As apparent from the foregoing description, according to the present invention, the thickness of an optical sectioned image can freely and surely be adjusted to a desired value during the observation of the specimen because the reflection characteristic or the transmission characteristic of the illuminated surface can be adjusted by spatial modulation using a specified spatial frequency by generating an electric control signal. Since the illuminated surface of the spatial modulator means can be divided into a plurality of regions and different spatial frequencies can be set for the individual regions, respectively, proper thicknesses can be set for the individual observation regions on the specimen, respectively.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A microscope system comprising:
    a control means capable of generating electric control signals;
    a spatial modulator means having an illuminated surface to be illuminated by light emitted by a light source, and capable of receiving the electric control signal and of spatially modulating reflection characteristic or transmission characteristic of the illuminated surface by a spatial frequency specified by the electric control signal;
    an illuminating optical means for illuminating a specimen with light spatially modulated by the spatial modulator means;
    an image detecting means for detecting a signal image formed by signal light emitted by the specimen illuminated by the illuminating optical means; and
    an arithmetic means for processing signal images formed by using the spatial frequency of at least three different phases set by the control means and detected by the image detecting means to obtain an optical sectioned image,
    wherein the control means is capable of dividing the illuminated surface of the spatial modulator means into a plurality of regions and of setting spatial frequencies for the individual regions.

2. The microscope system according to claim 1, wherein the control means is capable of setting a thickness for the optical sectioned image by setting the spatial frequency.

3. The microscope system according to claim 1, wherein the plurality of regions determined by dividing the illuminated surface correspond to divisional observation regions whose optical sectioned images need to be formed in different thicknesses, respectively.

4. The microscope system according to claim 1, further comprising a monitoring means having a monitor screen capable of displaying signal images respectively corresponding to the plurality of regions of the illuminated surface.

5. The microscope system according to claim 1, wherein the spatial modulator means is a digital micromirror device, and the illuminated surface is formed by arranging a plurality of micromirrors.

6. The microscope system according to claim 1, wherein the spatial modulator means is a liquid crystal device, and the illuminated surface is formed by arranging a plurality of liquid crystal cells.

7. The microscope system according to claim 1, wherein the spatial modulator means receives the electric control signal and is capable of sinusoidally spatially modulating the reflection characteristic or the transmission characteristic of the illuminated surface according to the electric control signal.

8. The microscope system according to claim 1, wherein the signal light is reflected light, transmitted light or fluorescent light.

* * * * *